United States Patent [19]

Cothran et al.

[11] 3,998,155
[45] Dec. 21, 1976

[54] DEPOSITORY SYSTEM

[75] Inventors: Martin D. Cothran, Euless; Lewis J. O'Kelly, Fort Worth, both of Tex.; Russell L. Hall, Scottsdale, Ariz.

[73] Assignee: Docutel Corporation, Dallas, Tex.

[22] Filed: May 30, 1974

[21] Appl. No.: 474,526

Related U.S. Application Data

[62] Division of Ser. No. 320,718, Jan. 3, 1973, Pat. No. 3,873,443.

[52] U.S. Cl. .............................. 101/110; 101/235; 194/DIG. 9; 271/184
[51] Int. Cl.$^2$ .......................................... B41J 1/32
[58] Field of Search ............... 101/110, 233–238, 101/240; 235/61.9 R, 61.12 R; 194/4 E, DIG. 9 B; 340/149 R, 172.5; 271/184

[56] References Cited

UNITED STATES PATENTS

| | | | |
|---|---|---|---|
| 2,708,405 | 5/1955 | Gegenheimer | 101/234 |
| 2,814,248 | 11/1957 | Federwitz | 101/233 X |
| 2,958,269 | 11/1960 | Simjian | 194/DIG. 9 B |
| 2,960,377 | 11/1960 | Simjian | 194/DIG. 9 B |
| 3,153,483 | 10/1964 | Simjian | 194/4 E X |
| 3,234,832 | 2/1966 | Niesen et al. | 101/232 |
| 3,487,905 | 1/1970 | James | 194/DIG. 9 B |
| 3,537,393 | 11/1970 | Hegi | 101/235 |
| 3,760,162 | 9/1973 | Holter | 194/DIG. 9 B |
| 3,778,596 | 12/1973 | Wapner | 235/61.9 R |
| 3,866,235 | 2/1975 | Maynard et al. | 194/9 B |

Primary Examiner—Edward M. Coven
Attorney, Agent, or Firm—Richards, Harris and Medlock

[57] ABSTRACT

Integral with a high speed, computer control banking machine is a depository system to provide a fully automatic teller station. At the customer interface there is an entry gate controlled to an open position by a solenoid actuated in accordance with computer generated signals. A deposit envelope inserted through the entry gate is detected by a light sensor as it moves along a belt transport extending to a printing station. Positioned along the belt transport is a second sensor, which in combination with the first sensor, determines the length of an inserted envelope to insure acceptance by the depository stacker pockets. After an envelope has been transported to the printing station, a numeric print machine is actuated to imprint on the envelope identifying data. A sensor responsive to the completion of the printing cycle actuates a transverse transport for delivering the envelope into one of two stacker pockets. An envelope deposited in one of the stacker pockets is detected by a light sensor that controls an elevator platform to insure sequential stacking of each inserted envelope.

9 Claims, 18 Drawing Figures

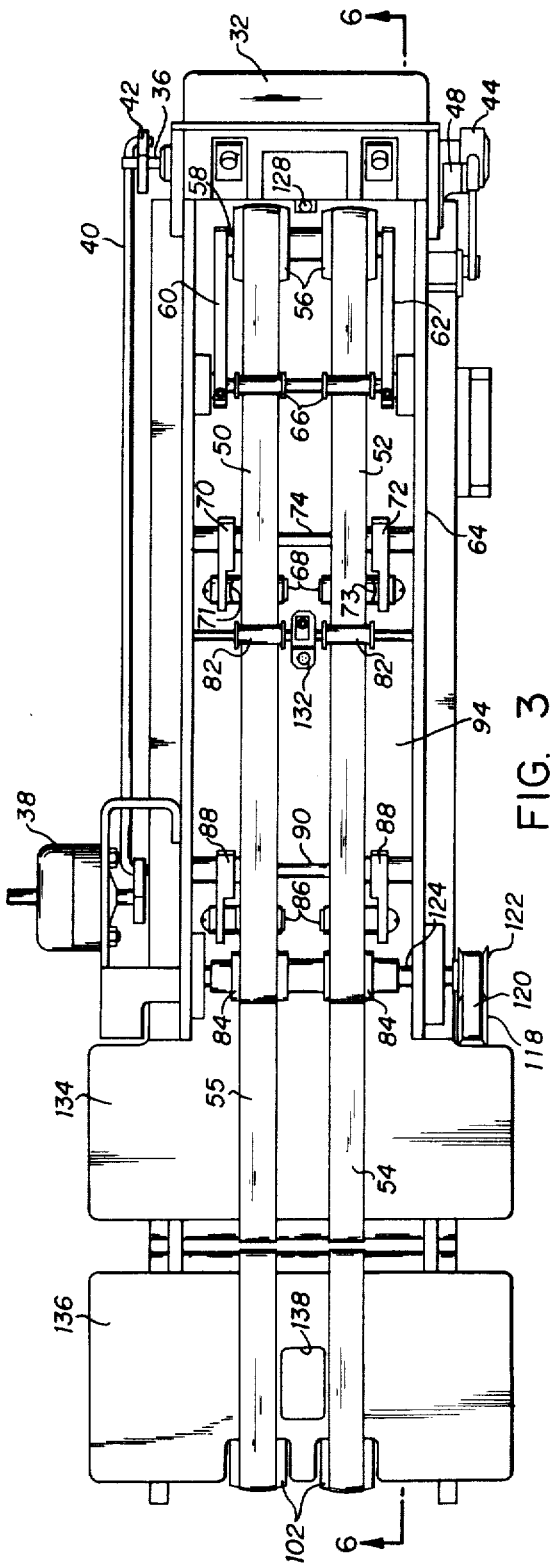
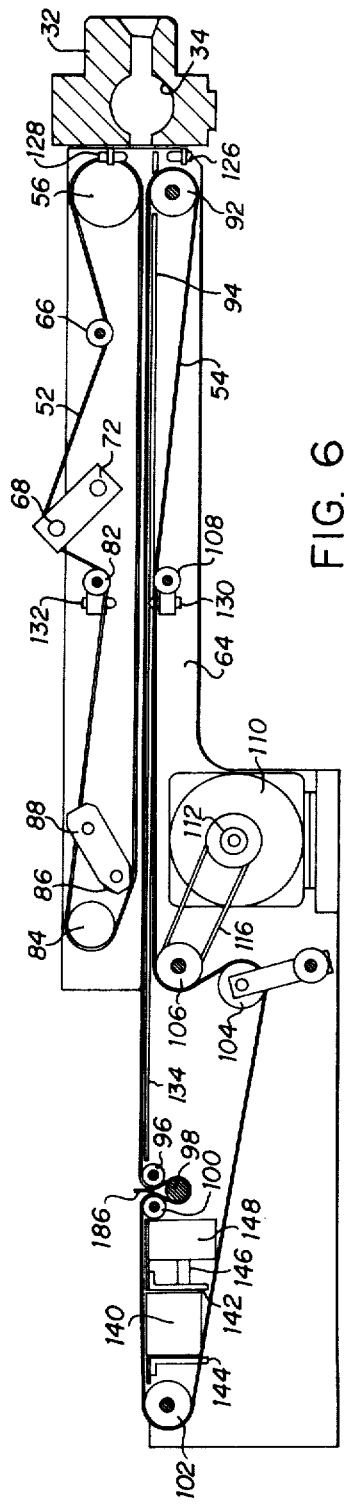
FIG. 3
FIG. 6

DEPOSITORY SYSTEM

This is a division of application Ser. No. 320,718 filed Jan. 3, 1973, now U.S. Pat. No 3,873,443.

This invention relates to a banking machine, and more particularly to an automatic depository system for use with a computer control banking machine.

Recent studies have shown that attempts are being made by the banking community to influence the general public to use fewer checks in their finacial transactions and to reduce paper work for in-bank services. This is primarily due to the difficulty of handling and processing large amounts of paper. In its place, there appears to be a wide use of credit cards for completion of daily household and business transactions.

A problem which has plagued the financial community with the increased use of credit cards is the unauthorized use of the card due to loss by the owner or theft. This particular problem has been minimized by a scrambling coding technique as described in the U.S. Pat. No. 3,662,343 of Kenneth S. Goldstein and John D. White, entitled "Credit Card Automatic Currency Dispenser".

With the risk of unauthorized use now minimized, the banking industry has accepted automatic currency dispensers for unattended distribution of cash to complete some business and personal transactions. This, financial institutions have found, provides customer convenience and eliminates the need for the construction and operation of branch banks, which are expensive and unprofitable.

A feature of the present invention is to provide a complete automatic banking system including a depository for accepting customer deposits and payments. An additional feature of the present invention is to provide a depository system in an automatic banking machine responsive to actuating signals from a computer controlled terminal machine. A depository in accordance with the present invention accepts deposit envelopes, prints a serial number on each successive envelope corresponding to the receipt serial number printed in the banking terminal and stacks each envelope sequentially in either of two stacker pockets.

A depository system in accordance with the present invention is utilized in conjunction with an automatic banking machine made operational in response to the insertion of a standard class A credit card. Where such automatic banking machines are operated unattended, a customer is not limited to normal banking hours or required to wait on the services of a bank employee to complete teller functions. However, the unattended operation of such automatic banking machines requires a strict security operation to prevent theft of funds and documents deposited therein. This requires careful control and checking of the depository system to insure proper operation for each transaction. Of considerable importance is the entry gate which responds to the proper opening control signals and also securely closes to prevent removal of deposited envelopes. It is also important in the unattended operation of a depository system that each deposit is identified with the corresponding transaction and only envelopes meeting certain dimensional specifications are accepted into the machine.

In accordance with the present invention, an automatic document depository responds to commands from a computer controlled automatic banking terminal. The depository includes an entry gate responsive to a command from the terminal computer such that it is actuated from a locked closed position to an open position for receiving a deposit envelope. A transport for moving the deposited documents from the entry gate to a station displaced therefrom is actuated and sensors respond to document movement through the transport to sense when the document has passed the entry gate. The sensors then generate a signal to the terminal computer to close the gate from an open position to a locked position. A document deposited and moved through the transport enters a stacker for storing the documents in the order received.

A more complete understanding of the invention and its advantages will be apparent from the specification and claims and from the accompanying drawings illustrative of the invention.

Referring to the drawings:

FIG. 3 is a top view of the longitudinal transport system for moving a deposit envelope from an entry gate to a print station.

FIG. 6 is a sectional view of the longitudinal belt transport taken along the line 6—6 of FIG. 3;

Figure 1:
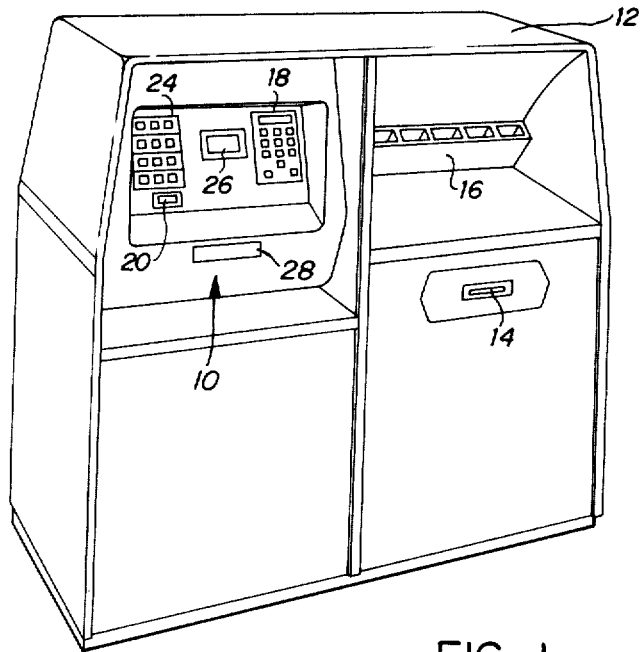
FIG. 1 is a pictorial view of a free standing model of an automatic banking machine including a deposit module containing the depository system of the present invention.
Figure 2:
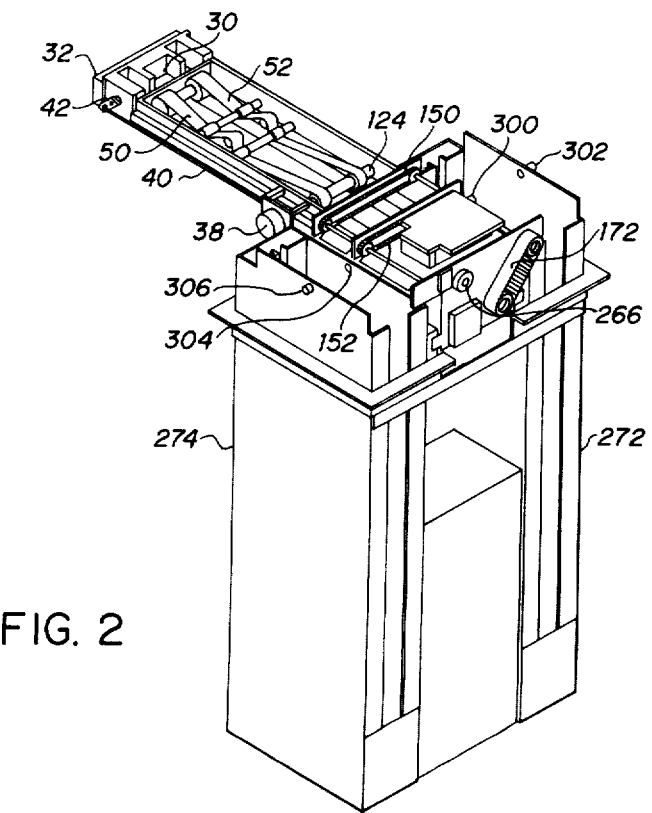
FIG. 2 is a perspective of a depository system utilizing a longitudinal belt transport and a chain transverse transport with two stacker pockets.
Figure 4:
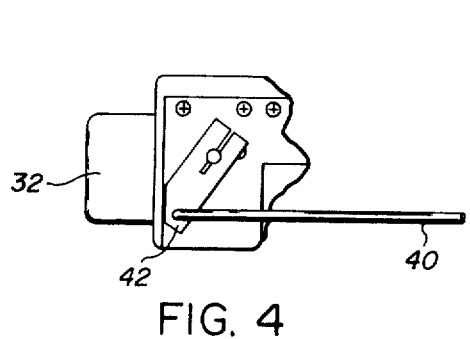
FIG. 4 is a detailed side view of the entry gate control mechanism.
Figure 5:
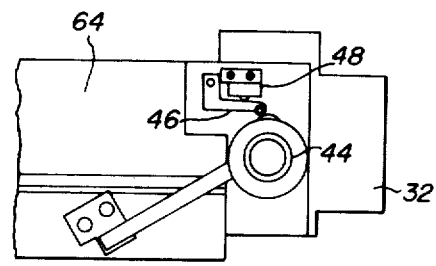
FIG. 5 is also a detailed view of the entry gate showing a gate open sensor.

Referring to FIG. 1, there is shown a free standing automatic banking machine including a console 10 which houses all operating controls and indicators of a currency dispensing mechanism, a card handler, a receipt/voucher printer and necessary power supplies in addition to customer interface equipment. In the free standing unit, the console 10 is mounted within a cabinet 12 which also houses an electronic module containing a computer and necessary interface connections to the console. Also housed within the cabinet 12 is a depository system 14 containing an envelope transport, a printing station, envelope stackers and necessary power supplies. A storage rack 16 is positioned within the cabinet 12 above the depository system 14 and provides an area for stationery supplies, such as envelopes.

On the front panel of the console 10 there is arranged an array of twelve push button keys in an amount-/security keyboard 18 for use by a customer to interface with the computer of the electronic module. In addition to the push bottom keys on the amount-/security keyboard 18, the front panel of the console 10 includes a transaction keyboard 24 consisting of twelve push buttons arranged in sets of three in four rows. The type of banking transaction performed by the banking machine depends upon the transaction key depressed in the keyboard 24.

In addition to the above controls and indicators, the front panel of the console 10 includes an instruction window display 26 that provides for viewing an illuminated display message drum. This drum instructs a user in the operation of the banking machine. The last user interface on the front panel of the console 10 is a cash drawer 28 that fits flush with the panel in a closed and locked position. A complete description of the console 10 and the various customer interface units will be found in the copending patent application of Harold Don Fought entitled "Banking Machine", filed Apr. 12, 1972, Ser. No. 243,339.

Referring to FIGS. 2–8, if a deposit or payment function is selected by any one of the push buttons of the transaction keyboard 24, a control signal is generated to the depository system 14 to open an entry gate 30 extending across the opening of the housing 32. The entry gate 30 is in the form of a full cylinder with a rectangular cutout extending along the longitudinal axis of the cylinder and rotatably mounted in a cavity 34 to rotate with a shaft 36 as an integral part of the gate 30. Movement of the entry gate 30 is controlled by a rotary solenoid 38 receiving an energizing signal from the system computer and linked to the entry gate by means of a drive link 40 coupled to an arm 42, the arm 42 attached to the entry gate shaft 36.

Opposite from the arm 42, the shaft 36 carries a cam 44 that positions a cam follower 46 for actuating a micro switch 48. The rotation of the cam 44 produces a movement of the cam follower 46 to actuate the micro switch 48 and thereby generate a signal to the system computer to indicate the entry gate 30 is open and ready to receive a deposit envelope.

An envelope inserted through the housing 32 is picked up by a longitudinal transport comprising upper belts 50 and 52 and corresponding lower belts 54 and 55 as shown in FIGS. 3 and 6. At the housing 32, the belts 50 and 52 travel on rollers 56 rotating on a shaft 58 supported by pivot arms 60 and 62. The pivot arms 60 and 62 are individually attached to a transport frame 64. By use of the pivoted arm construction, the rollers 56 provide a floating action to the belts 50 and 52 to adjust for various thicknesses of a deposit envelope inserted into the system.

Figure 7:
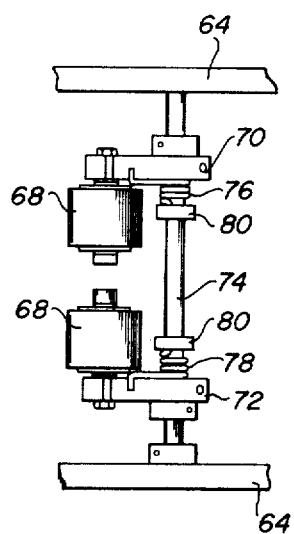
FIG. 7 is a top view detail of a pair of belt transport tension rollers.
Figure 8:
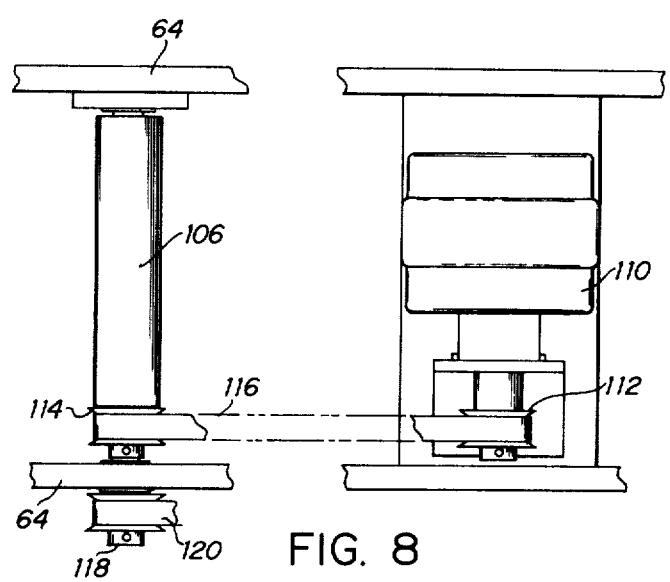
FIG. 8 is a detailed view of the main drive for the longitudinal belt transport.

In the upper travel path for the belts 50 and 52 the belts pass under idler rollers 66 and then over tension rollers 68. To aid in tracking the belts 50 and 52, spherical washers 71 and 73 are positioned between the rollers 68 and the respective supporting arms 70 and 72. As shown by the detail of FIG. 7, the tension rollers 68 are mounted to arms 70 and 72 to rotate on a shaft 74. Each of the arms 70 and 72 to rotate on a shaft 74. Each of the arms 70 and 72 is spring biased by means of helical torsion springs 76 and 78. One end of each of the springs 76 and 78 engages the respective arm 70 or 72 and the other end is attached to the shaft 74 by means of a collar 80. As constructed, the tension rollers 68 maintain the belts 50 and 52 in a taut condition to provide maximum transport power to move a deposit envelope through the depository system.

Following the tension rollers 68, the belts 50 and 52 pass under idler rollers 82 and then over a drive roller 84 secured to a drive shaft 124. The upper belts 50 and 52 extend only to the roller 84. The travel path for the upper belts also includes tension rollers 86 mounted by means of arms 88 to a shaft 90 and biased to rotate counterclockwise. To maintain the belts in a straight transport path the rollers 86 are equipped with spherical washers the same as the rollers 68.

The lower belts 54 and 55 travel about idler rollers 92 at a housing 34. The belts 54 and 55 pass over a table 94 to a diverter roller system including idler rollers 96, 98 and 100. The purpose of this belt diversion will be explained.

After passing over the idler roller 100, the belts 54 and 55 travel over idler rollers 102 at the end of the longitudinal transport path.

The return path for the belts 54 and 55 includes tension rollers 104 mounted to be spring biased to maintain tension on the belts in the travel path. Following the tension rollers 104, the belts 54 and 55 pass over a drive roller 106 and then over an idler roller 108.

The drive roller 106 is powered by a transport motor 110 having a sprocket 112 on an output shaft. A sprocket 114 is mounted on the shaft supporting the drive roller 106 and a timing belt 116 provides a positive drive link from the motor 110 to the drive roller 106. Also mounted on the shaft supporting the sprocket 114 is a sprocket 118 that carries a timing belt 120 engaging a sprocket 122 mounted to the shaft 124 supporting the drive roller 84. Thus, operation of the transport motor 110 through the timing belts 116 and 120 provides motion for both the upper belts 50 and 52 and the lower belts 54 and 55.

As a deposit envelope passes through the housing 32 and enters the longitudinal transport, the leading edge thereof interrupts a light beam between a light source 126 and a photocell 128. A signal generated by the photocell 128 informs the system computer that a deposit envelope has been inserted into the depository system. As the envelope is transported along the longitudinal belt system, it interrupts a light path from a light source 130 to a photocell 132. Typically, the photocells 128 and 132 are of the type that have a change in conductivity varying with the light impinging thereon.

A signal from the photocell 132 is also transmitted to the system computer as an indication that a deposit envelope has moved through the transport to the photocell 132. As will be explained, if light to both the photocells 128 and 132 is interrupted simultaneously, a "too long" envelope signal is generated. This "too long" signal to the system computer reverses the direction of operation of the transport motor 110 and a deposit envelope is returned through the entry gate 30.

A deposit envelope transported through the longitudinal belt system exits on a front table 134 as an extension of the table 94 and is transported by the lower belts 54 and 55 to a rear table 136. Centrally located within the rear table 136 is a window 138 below which is positioned an ink pad block 140 rotatably mounted between brackets 142 and 144. The ink pad block 140 is attached to the output shaft 146 of a rotary solenoid 148. In the operation of the total depository system, prior to activating the transport, a signal from the central controller actuates the solenoid 148 to rotate the ink pad block 140 in alignment with a printing wheel, as will be explained.

Figure 11:
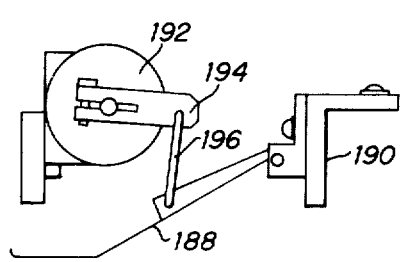
FIG. 11 is a side view detail of a depository envelope guide positioned between the longitudinal belt transport and a printing station.
Figure 9:
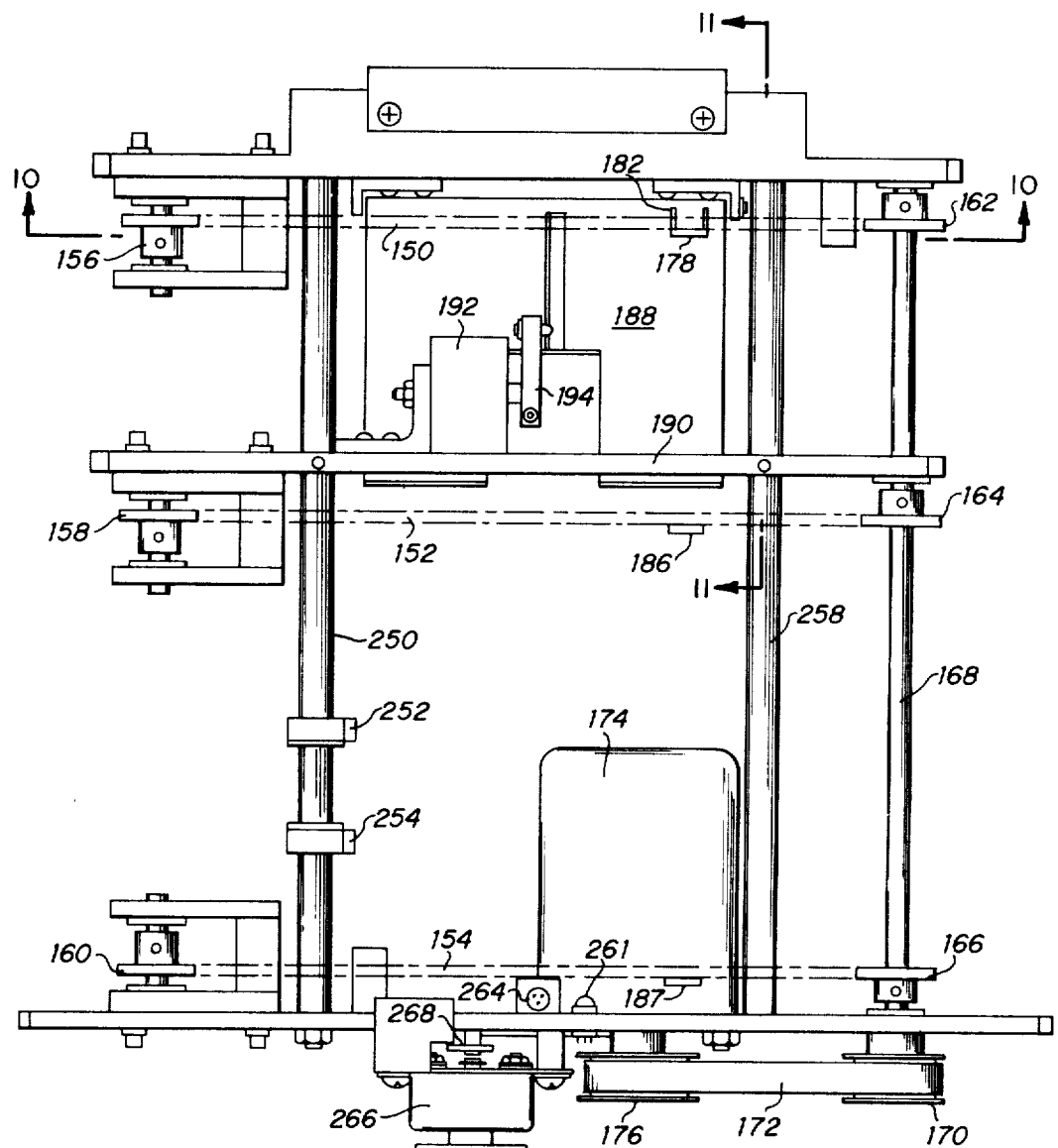
FIG. 9 is a top view of the chain transverse transport of the depository system of FIG. 2.
Figure 10:
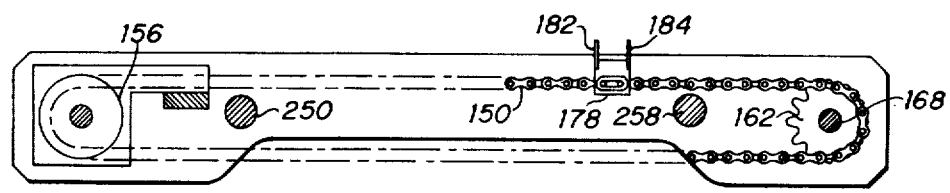
FIG. 10 is a sectional view of the chain transverse transport taken along the line 10—10 of FIG. 9.

Referring to FIGS. 9–11, a deposit envelope moving over the front and rear tables 134 and 136 is positioned in the area of the transverse transport comprising parallel positioned, endless chains 150, 152 and 154. Each of the chains 150, 152 and 154 rotates on an idler sprocket 156, 158 and 160, respectively, and on a drive sprocket 162, 164 and 166. The drive sprockets 162, 164 and 166 are mounted to a drive shaft 168 carrying at one end thereof a drive sprocket 170. Coupled to the drive sprocket 170 by means of a timing belt 172 is a transport motor 174 having a sprocket 176 on the output shaft and carrying the timing belt. The chains 150, 152 and 154 are positioned to travel laterally across the lower belts 54 and 55.

Each of the chains 150, 152 and 154 carries a sweeper as part of the coupling link for the chain. The sweeper 178 for the chain 150 includes flexible wipers 182 and 184 that contacts with the plate 134 to sweep a deposit envelope therefrom into one of two stacker pockets. With regard to the chain 152, the sweeper 186 is also part of the coupling link and comprises a flexible bar that travels through the space between the plates 134 and 136. This bar, as shown by reference in FIG. 6, extends between the belts 54 and 55 in the groove formed by the idler rollers 96, 98 and 100. This insures a positive sweeping of a deposit envelope from the tables 134 and 136 into one of the stacker pockets. For the chain 154, the sweeper 187 is part of the coupling link and is a solid bar that sweeps an envelope from the table 136. The sweeper 187 also functions as a flag to interrupt a light path between a light emitting diode and a photocell 261. Interrupting light from the photocell 261 causes a signal to be sent to the system computer indicating that the transverse transport has swept a deposit envelope into one of the stacker pockets. The system computer then sends a signal to de-energize the transport motor 174.

As a deposit envelope enters the transverse transport mechanism, a divert plate 188, pivotally mounted to a support bracket 190, is rotated downward to guide the envelope into the transverse transport mechanism and a printing station. The divert plate 188 is positioned by means of a rotary solenoid 192 having an arm 194 bolted to the output shaft. A coupling link 196 interconnects the arm 194 to the divert plate 188. A signal to energize the solenoid 192 is received from the system computer of the banking terminal.

Figure 12:
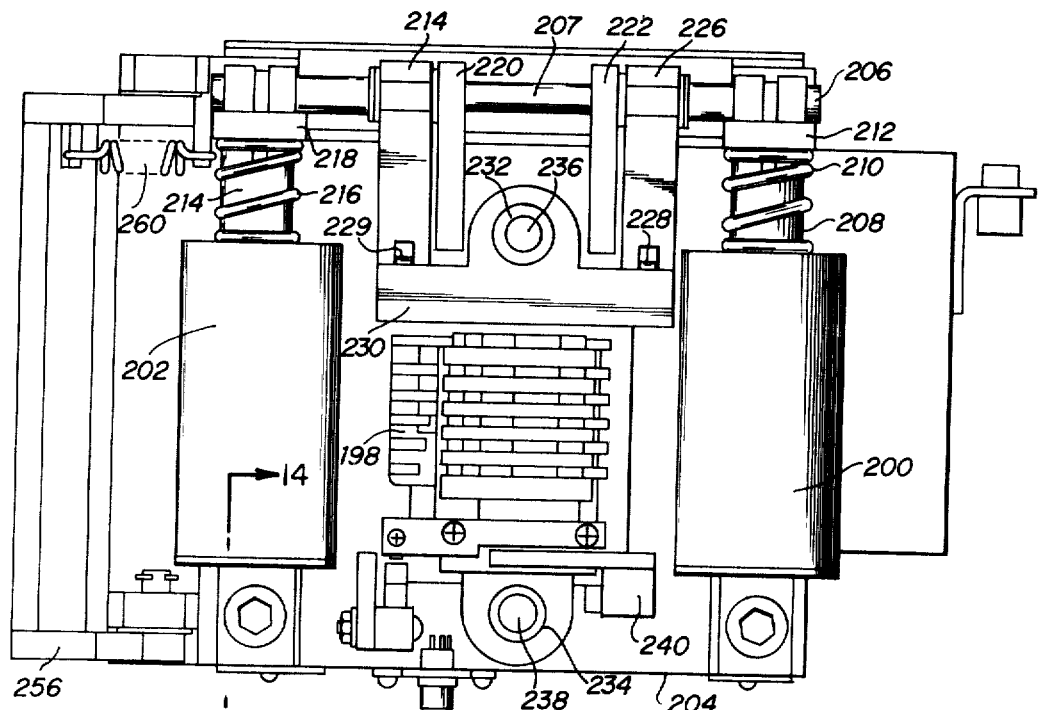
FIG. 12 is a bottom view of the printing station including a five character numeric print machine.
Figure 14:
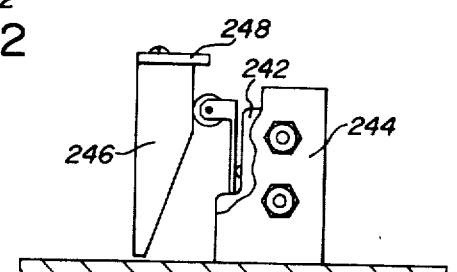
FIG. 14 is a detail view of an actuator and micro switch for generating a signal indicating the completion of a printing cycle as taken along the line 14—14 of FIG. 12.
Figure 13:
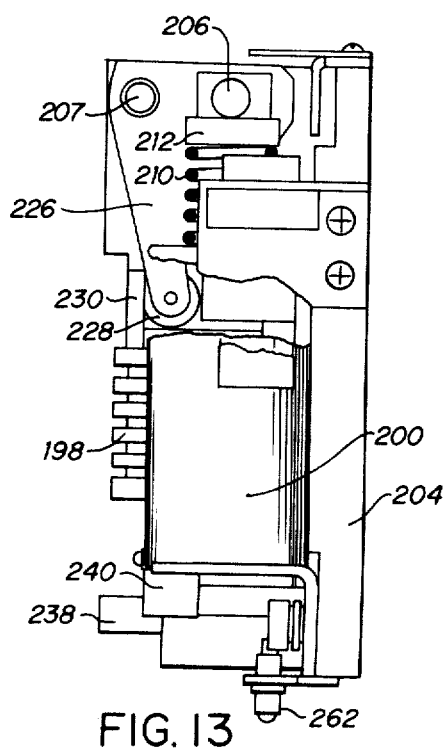
FIG. 13 is a side view of the printing station showing the numeric print machine actuator including a positioning solenoid.

Referring to FIGS. 12–14, a deposit envelope positioned on the tables 134 and 136 is moved into a printing station wherein a serial number of the transaction is imprinted thereon to match with an identical serial number on a receipt printed by operation of the console 10.

The transaction serial number is imprinted by a five digit numeric print machine 198 driven against an envelope positioned on the tables 134 and 136 by actuating solenoids 200 and 202 in response to a command signal from the system computer. The system computer generates the command signal as an envelope moves into the print station and interrupts energy impinging on the photocell 264.

Each of the solenoids 200 and 202 is mounted on a base plate 204 and includes an armature connected to a drive shaft 206. For the solenoid 200, an armature 208 is biased into an extended position by means of a spring 210 in contact with a washer 212. Similarly, for the solenoid 202, an armature 214 is biased into an extended position by means of a spring 216 engaging a washer 218 in contact with the shaft 206.

Secured to the shaft 206 is a solenoid driver link 226 having a roller follower 228 in contact with a mounting plate 230 supporting the numeric print machine 198. Similarly, the shaft 206 is connected to a driver link 224 having a roller follower 229 in contact with the mounting plate 230. Both the driver links 224 and 226 are rotatably mounted on a shaft 207. The shaft 206 is mounted to the base plate 204 by means of brackets 220 and 222. The mounting plate 230 includes bearings 232 and 234 for guiding the numeric print machine 198 by means of guide posts 236 and 238.

In operation of the serial number printer, actuating the solenoids 200 and 202 causes the shaft 206 to be pulled toward the solenoid coils thereby rotating the driver links 224 and 226 on the shaft 207. Rotating the driver links 224 and 226 forces the rollers 228 and 229 against the mounting plate 230 thereby driving the numeric print machine 198 against a deposit envelope.

To signal the system computer that the numeric print machine 198 has been actuated, a micro switch 242 attached to a bracket 244 as part of the base plate 204 is actuated by movement of a cam follower 246 with the numeric print machine 198. The cam follower 246 is attached to the mounting plate 230 by means of a bracket 248.

The entire assembly of the print module, as attached to the base plate 204, is pivotally mounted to a support rod 250 (see FIG. 9) by means of mounting brackets 252 and 254. The mounting brackets 252 and 254 are attached to the base plate 204. To secure the print module in place, a latch bar 256 is pivotally mounted to the base plate 204 and includes apertures for engaging a support bar 258 of the transverse transport mechanism. The latch bar 256 is biased into a latching position by means of a spring 260.

Also mounted to the base plate 204 is a light emitting diode 262 that provides a light beam to the photocell 261 as part of the transverse transport. As the sweeper 187 of the chain 154 passes between the light emitting diode 262 and the photocell, the photocell generates a home positioned signal for the transverse transport to the system computer indicating a deposit envelope has been swept from the print station.

Referring to FIG. 9, to index the numeric print machine 198 from the system computer, a solenoid 266 is mounted to the frame of the transverse transport. Energizing this solenoid drives an armature 268 against a cam follower 240 to index the numeric print machine. The numeric print machine may also be indexed by manually rotating the print wheels.

Figure 16:
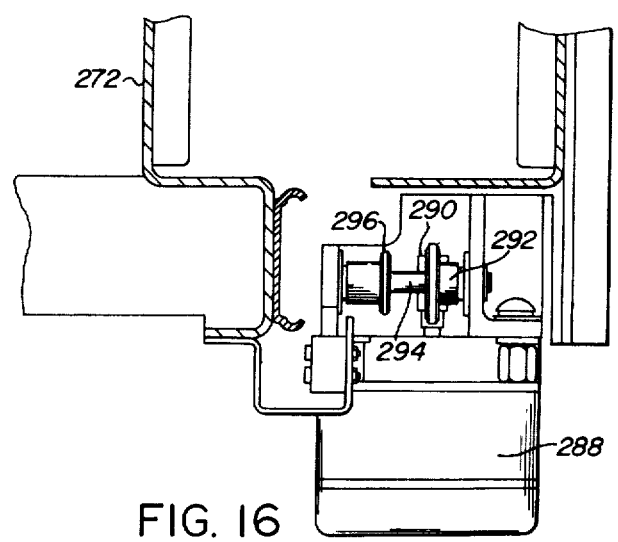
FIG. 16 is a partial sectional view of the drive mechanism for one of the stacker pockets of the document stacker taken along the line 16—16 of FIG. 15.
Figure 17:
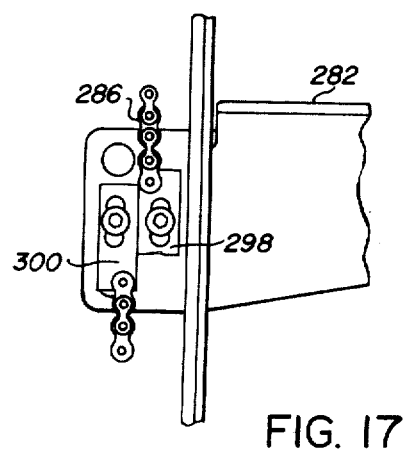
FIG. 17 is a detail view of an elevator pad of one stacker pocket taken along the line 17—17 of FIG. 15.
Figure 15:
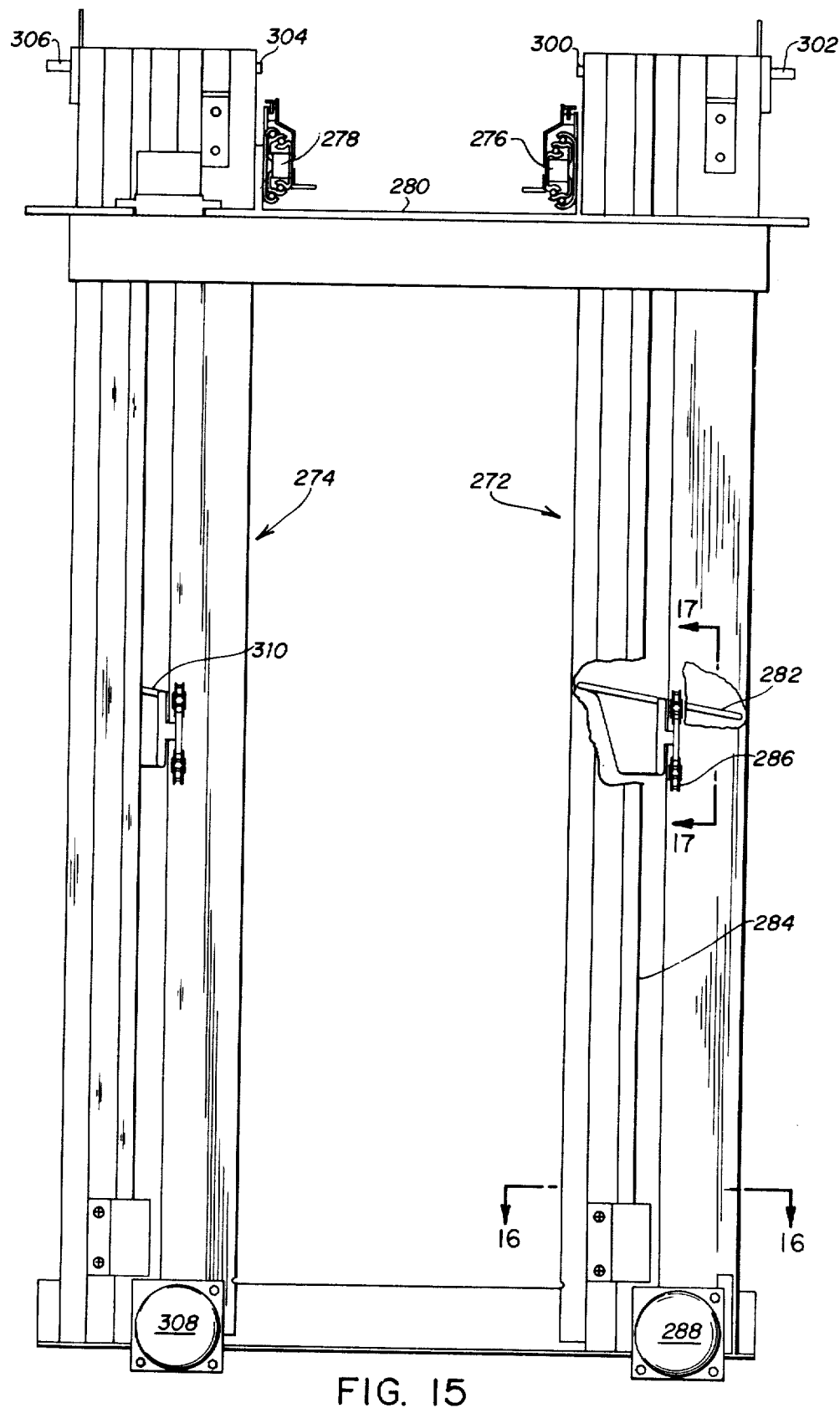
FIG. 15 is an end view of a document stacker including two stacker pockets.

After imprinting a serial number on a deposit envelope in the print station, the transverse transport is actuated to sweep the deposit document into one of two stacker pockets. Referring to FIGS. 15-17, envelopes from the transverse transport will be stored in one of the stacker pockets 272 or 274 in accordance with an established operating procedure. For example, all envelopes swept from the printing station will be stored in the stacker pocket 274 until this pocket has been filled to a preselected height. Then, the transverse transport will reverse direction to deposit envelopes in the stacker pocket 272.

To orient the stacker pockets with respect to the print station, ball bearing slides 276 and 278 are shown mounted to a support bracket 280. The longitudinal transport and the print station are mounted to move on the tracks 276, 278.

Since the stacker pockets 272 and 274 are similar in construction and operation, only the pocket 272 will be described in detail. Each stacker pocket comprises a rectangularly shaped housing to accept envelopes having a certain maximum dimensional outline. An envelope from the transverse transport is delivered to the top of a stack of such envelopes supported in the stacker pocket 272 on a platform 282. The platform is guided by a linear motion slide 284. It is positioned by means of a chain 286 driven by a motor 288. The motor 288 coupled to the chain 286 by means of a worm 290 engaging a worm gear 292, the latter mounted to a shaft 294 that also has attached thereto a sprocket 296 for driving the chain. The chain 286 is attached to the platform 282 by means of tabs 298 and 300 bolted or otherwise secured to an extension of the platform 282.

At the top of the stacker pocket 272, there is a light source 302 providing a light beam to a photocell 300. Each time a deposit envelope is swept from the printing station by the transverse transport, as it falls into the stacker pocket it breaks the light beam from the source 302 to the photocell 300. If the beam is still broken when the transverse transport reaches its home position, the depository electronics produces a drive signal for the motor 288. The motor 288 runs for a period sufficient to lower the position of the platform 282 an increment sufficient to allow the next deposit envelope to enter the stacker pocket. Initially, the platform 282 is positioned at the top of the stacker pocket and is subsequently stepped to a lower limit as each deposit envelope is delivered into the pocket. When the platform 282 has reached the lower limit, a micro switch (not shown) is actuated to generate an instruction to the system computer that the pocket 272 is full and cannot accept additional envelopes.

In construction and operation, the pocket 274 is essentially the same as the stacker pocket 272 wherein as an envelope enters the pocket a light beam from a source 306 to a photocell 304 is interrupted to position a platform 310. When the platform 310 reaches a lower limit, a micro switch (not shown) is actuated to change operation to the stacker pocket 272.

Figure 18:
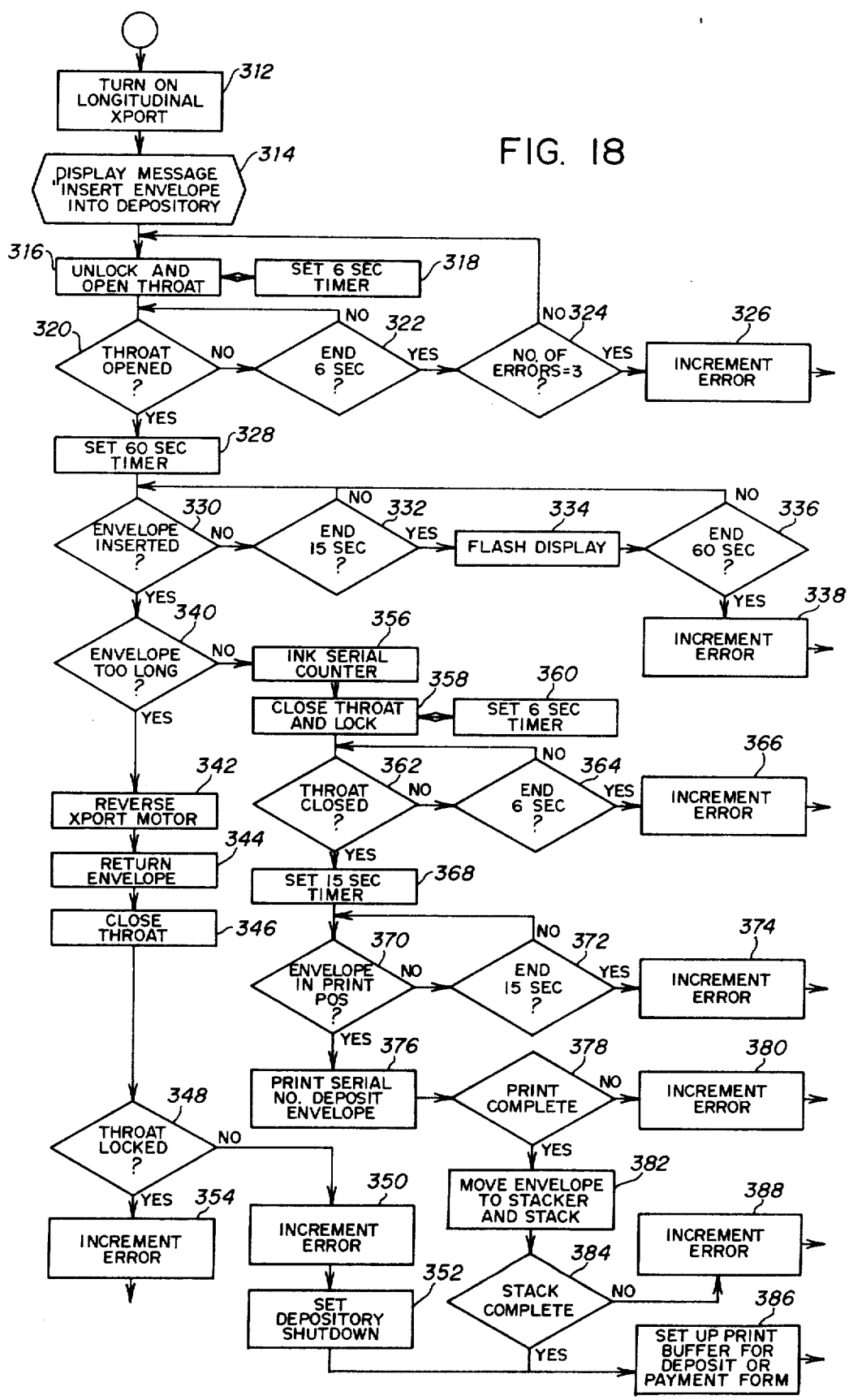
FIG. 18 is a flow chart of the operation of a depository system in response to control signals from a computer controlled automatic banking terminal.

Referring to FIG. 18, when the depository receives a command from the system computer of the console 10 to accept a deposit, a programmed sequence is followed to complete each of the various transactions of the depository and to check the operation thereof. Initially, the longitudinal transport motor 110 is turned on by the computer in the "turn on" transport step 312. Following energization of the transport motor 110, the system computer activates the instruction window display 26 to display the message "Insert Envelope Into Depository" as given by the display step 314. Next, the entry gate 30 (throat) is unlocked and the rotary solenoid 38 energized to open the entry gate. Unlocking and opening the entry gate 30 is completed in the unlock and open throat step 316. At this time, a 6 second time out 318 begins. Before the six second time out 318 is completed, the cam 44 must actuate the micro switch 48 to generate a gate open signal to the system computer. Inquiry 320 is continuously made to determine if the entry gate 30 has opened. A negative response to the inquiry 320, indicating the entry gate has not fully opened, produces a negative response and the operation sequence proceeds to inquiry 322 to evaluate if the six second time out 318 has been completed. If the 6 second time out has not been completed, the sequence returns to inquiry 320.

A positive response to the inquiry 322, indicating the six second time out 318 has been completed, advances the operation sequence to error step 326. A complete understanding of the error operation sequence will be found in the copending patent application of Harold Don Fought.

A positive response to the inquiry 320 advances the operating sequence to a sixty second time out 328. Envelope insert inquiry 330 is then made to determine if the customer has inserted a deposit envelope through the entry gate. The photocell 128, responding to movement of an envelope through the entry gate, provides the system computer with the signal to complete the inquiry 330. A negative response to the inquiry 330 advances the sequence to a timing inquiry 332 which is an operation that checks the time elapsed from the opening of the entry gate 30. Inquiry 322 is a 15 second time check and a negative response returns the sequence to inquiry 330. A positive response advances the sequence to a flash display step 334 which produces a flashing display at the instruction window 26. The sequence then advances to inquiry 336 wherein a negative response returns the sequence to inquiry 330 and a positive response advances the operation to an error step 338 which is a system error subroutine as described in the copending patent application of Harold Don Fought.

A positive response to the envelope insert inquiry 330 advances the sequence to an envelope length inquiry 340 which is a determinaton of the envelope length. If light to both the photocells 128 and 132 is interrupted at the same time by an envelope in the longitudinal transport, then inquiry 340 results in a positive response and the sequence advances to a reverse transport step 342 wherein the transport motor 110 is energized to run in a reverse direction to reject the deposit envelope through the entry gate 30. The envelope is returned during a return step 344 and as the envelope clears the photocell 128 the system computer energizes the solenoid 38 during a close throat step 346 to close the entry gate. The operating sequence then advances to a throat lock inquiry 348 wherein a negative response advances the sequence to an error step 350 and subsequently to a depository shutdown step 352. A positive response to the inquiry 340 advances the sequence to an error step 354 which is an error operation to advance the total system sequence to an error subroutine.

Returning to the envelope length inquiry 340, if a proper sized envelope has been inserted through the entry gate 30 then as the light beam to the photocell 132 is interrupted the photocell 128 will be receiving light from the source 126. Inquiry 340 then generates a negative response and the operating sequence advances to an ink counter step 356. During the ink counter step 356 the ink pad block 140 is rotated by energizing the solenoid 148 and the numeric machine 198 is inked. The sequence advances to a close throat step 358 wherein the solenoid 38 is de-energized to close the entry gate 30. A five second time out 360 is started at this time and the sequence advances to the throat closed inquiry 362 in response to a signal from the switch 48 to determine if the entry gate 30 has been closed. A negative response to the inquiry 362 indicates the entry gate has not been closed and the sequence advances to the inquiry 364 which makes a determination of whether or not the five second time out 360 has been completed. A negative response to inquiry 364 returns the sequence to inquiry 362 and a positive response advances the sequence to an error step 366.

A positive response to the throat closed inquiry 362, indicating that the entry gate 30 has been closed and locked, advances the sequence to a 15 second time out 368 and then to an envelope position inquiry 370. When a deposit envelope moving through the longitudinal transport interrupts the photocell 264 the envelope is in a print position. If an envelope has not reached this position, inquiry 370 generates a negative response to advance the sequence to a time inquiry 372 which makes a determination of the 15 second time out 368. Before the fifteen second time out 368 has been completed, the sequence advances from inquiry 372 back to inquiry 370. After the 15 second time out, the sequence advances to reset the 15 second time out, at the end of this time out the sequence advances to a print and stack routine and sequences through a normal exit routine.

Interrupting the light source to the photocell 264 advances the operating sequence to a print serial number step 376 wherein the solenoids 200 and 202 are energized to position the numeric print machine 198 to print a serial number on the deposit envelope. The sequence then advances to a print condition inquiry 378 which responds to a signal from the micro switch 242. If the micro switch 242 has not been actuated by a return of the numeric print machine 198 to a home position, then a negative result is generated by the inquiry 378 and the sequence advances to an error step 380. A positive response to the inquiry 378, indicating that the numeric print machine 198 has tripped the micro switch 242, produces a positive response to advance the sequence to a stacker step 382 wherein the transverse transport motor 174 is energized to move the deposit envelope into one of the stacker pockets 272 or 274.

A stacking complete inquiry 384 is then made and if the stacking has been completed, a positive response results from the inquiry 384 and the depository function is completed. The sequence then advances to a recycle step 386 for returning the depository to a position for receiving an additional deposit envelope.

If the stacking operation has not been completed, the inquiry 384 generates a negative response and the operation advances to an error step 388.

In summary, the operation of the depository of the present invention accepts a deposit envelope after it has been inserted through an entry gate 30. The deposit envelope is then engaged by four belts and transported to a print position. Three photocell sensors monitor the position and length of the envelope during its transport.

If an over-length envelope is detected, the transport motor 110 will reverse and the envelope is returned to the customer. For security, the entry gate is closed and locked after the deposit envelope clears the entrance photocell 126. The print solenoids 200 and 202 are energized and, after printing has been verified, the transverse transport motor 142 is energized to move the envelope to one of two stacker pockets. The transport motor stops when the transport home photocell 261 is blocked. If the stacker photocell is blocked, the stacker elevator is lowered until the photocell is clear. If no errors have been incurred and at least one stacker is not full, the depository is ready to process another transaction.

While only one embodiment of the invention, together with modifications thereof, has been described in detail herein and shown in the accompanying drawings, it will be evident that various further modifications are possible without departing from the scope of the invention.

What is claimed is:

1. In an automatic document depository responsive to commands from a central controller, comprising in combination:
   first transport means for moving the deposit document from an entry gate to print station displaced therefrom,
   a divert plate mounted at the print station in the path of the moving document on said first transport means and movable into a position to guide a deposit document into the print station,
   printer means positioned to receive a deposit document guided by said divert plate from said first transport means at the print station in response to commands from the central controller to print selected characters on the deposit document,
   first sensor means responsive to the positioning of the deposit document at the print station to generate a signal to the central controller, the controller actuating said printer means to imprint the selected characters on the positioned document,
   second sensor means responsive to the actuation of said printer means to generate a print check signal to the central controller as an indication of the actuation of said printer means,
   stacker means receiving a deposit document from the print station for storage thereof, and
   second transport means positioned transverse to said first transport means and including at least one sweeper extending into the print station to remove a document from said transport means for delivery to said stacker means.

2. In an automatic document depository as set forth in claim 1 wherein said sweeper comprises a continuous chain and includes a sweeper bar attached thereto and extending into the path of a moving document in said first transport means.

3. In an automatic document depository as set forth in claim 1 wherein said stacker means includes an elevator having a platform for receiving a deposit document from said second transport, and further the document depository includes means for positioning said stacker means in response to a document delivered thereto.

4. In an automatic document depository as set forth in claim 3 including a document sensor at said elevator for sensing the delivery of a document to the platform and generating a delivery signal to the central controller, the central controller then positioning said platform.

5. In an automatic document depository responsive to commands from a central controller, comprising in combination:
    transport means for moving the deposit document from an entry gate to a print station displaced therefrom,
    a divert plate mounted at the print station in the path of the moving document on said transport means and movable into a position to guide a deposit document into the print station,
    printer means positioned to receive a deposit document guided by said divert plate from said transport means at the print station in response to commands from the central controller to print selected characters on the deposit document,
    first sensor means responsive to the positoning of the deposit document at the print station to generate a signal to the central controller, the controller actuating said printer means to imprint the selected characters on the positioned document, and
    second sensor means responsive to the actuation of said printer means to generate a print check signal to the central controller as an indication of the actuation of said printer means.

6. In an automatic document depository as set forth in claim 5 wherein said printer means includes character wheels having the selected characters for imprinting on the deposit document and a solenoid actuator for driving said character wheels against the deposit document for imprinting thereon.

7. In an automatic document depository as set forth in claim 6 including means to index the character wheels to a subsequent selected character combination.

8. In an automatic document depository as set forth in claim 5 including stacker means receiving a document from the print station after imprinting of characters thereon for storing the document in the order received.

9. In an automatic document depository as set forth in claim 5 including means responsive to the movement of a document through said transport means to generate an input signal to the central controller that in turn generates an output signal and further including means for actuating said divert plate from a first position to a divert position in response to the output signal from the central controller.

* * * * *